(No Model.)
J. PETTINGER.
VEHICLE WHEEL BEARING.
No. 556,640. Patented Mar. 17, 1896.
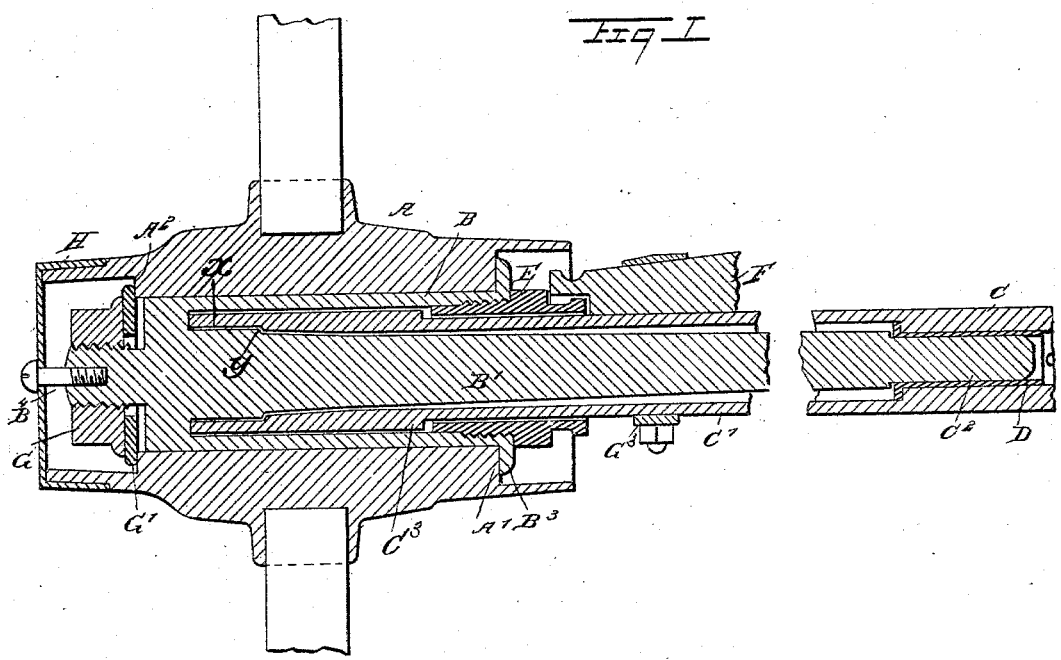
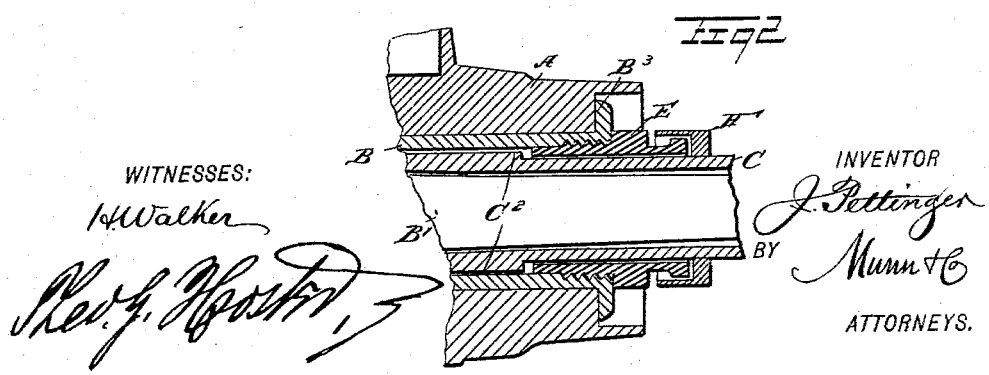
WITNESSES:
H. Walker
INVENTOR
J. Pettinger
BY Munn & Co.
ATTORNEYS.

UNITED STATES PATENT OFFICE.

JOHN PETTINGER, OF SANTA BARBARA, CALIFORNIA.

VEHICLE-WHEEL BEARING.

SPECIFICATION forming part of Letters Patent No. 556,640, dated March 17, 1896.

Application filed May 17, 1895. Serial No. 549,681. (No model.)

*To all whom it may concern:*

Be it known that I, JOHN PETTINGER, of Santa Barbara, in the county of Santa Barbara and State of California, have invented a new and Improved Vehicle-Wheel Bearing, of which the following is a full, clear, and exact description.

The invention consists principally of a hub-box having an integral spindle adapted to engage a tubular axle.

The invention also consists of certain parts and details and combinations of the same, as will be fully described hereinafter and then pointed out in the claim.

Reference is to be had to the accompanying drawings, forming a part of this specification, of which similar characters of reference indicate corresponding parts in both the figures.

Figure 1 is a sectional side elevation of the improvement. Fig. 2 is a like view of a modified form of dust-cap.

The hub A of the vehicle-wheel is provided with a hub-box B, made cylindrical at its inner end and solid near the forward end, with a spindle B' projecting from the solid end rearwardly through the cylindrical part, as plainly illustrated in the drawings. This spindle B' extends into the tubular end C' of an axle C, and the end of the said spindle is reduced, as at C², to engage a bearing D secured in the tubular part of the said axle C. The outer end of the spindle and that which is opposite the reduced end C² is formed with an enlargement X, which is received in a counter-enlargement Y formed at the adjacent end of the axle.

The spindle B' is preferably about eighteen inches long, so as to afford a good connection between the spindle and the axle. A collar or nut E screws on the inner end of the hub-box B, to abut with its inner end on a shoulder formed by an enlargement C³, shrunk or otherwise secured to the end of the axle. The inner end of the hub-box B is preferably provided with a flange B³ engaging a shoulder A' formed in the inner recessed end of the hub A. If desired, an axle-stock F may be attached to the axle C by a clip G³ in the usual manner.

The forward solid end of the hub-box B is provided with the usual threaded reduced portion B⁴, on which screws a nut G abutting on a collar G' resting on a shoulder A² in the outer recessed end of the hub A. A dust-cap H is secured on the outer end of the hub A to prevent dust from passing to the hub-box, and a similar dust-cap H' is secured to the axle C to extend with its flange over the collar E, as shown in Fig. 2.

It will be seen that a considerable quantity of lubricant can be passed into the space between the spindle B' and the tubular end C' of the axle, so that the wheel can be run for a long time without requiring a reapplication of the lubricant.

It will be seen that by the arrangement described the friction of the bearing parts is reduced to a minimum, and the wheel-hub A, by reason of the long spindle B', will always maintain a proper relation to the axle C, so that the wheel will run perfectly at all times, and consequently wabbling of the wheel is prevented.

It will further be seen that by the arrangement described the axles can be very easily set and are less liable to get out of the true set.

Having thus fully described my invention, I claim as new and desire to secure by Letters Patent—

A vehicle-bearing, comprising a hub having a hub-box therein, the same being hollow, a centrally-located spindle projecting from the outer end of the hub-box inwardly and beyond the hub and having at its inner extremity a reduced portion and having an enlargement at its outer extremity, a hollow axle fitting in the hub-box and receiving the spindle and having at its inner portion a reduced recess receiving the inner end of the spindle, the axle also having a counter-enlargement at its outer extremity receiving the enlargement at the outer portion of the axle, and an exteriorly-threaded nut embracing the hollow axle and screwing into the inner end of the hub-box, substantially as described.

JOHN PETTINGER.

Witnesses:
JOSEPH J. PERKINS,
C. M. GIDNEY.